United States Patent [19]
Deininger et al.

[11] Patent Number: 5,380,443
[45] Date of Patent: * Jan. 10, 1995

[54] METHOD OF TREATING WASTE WATER

[75] Inventors: James P. Deininger; Linda K. Chatfield, both of Colorado Springs, Colo.

[73] Assignee: The Regents of the University of California, Oakland, Calif.

[*] Notice: The portion of the term of this patent subsequent to Jan. 8, 2008 has been disclaimed.

[21] Appl. No.: 776,246

[22] PCT Filed: May 9, 1990

[86] PCT No.: PCT/US90/02509

§ 371 Date: Nov. 7, 1991

§ 102(e) Date: Nov. 7, 1991

[51] Int. Cl.$^6$ ............................................. C02F 1/62
[52] U.S. Cl. ................................. 210/724; 210/726; 210/912; 423/34; 423/101
[58] Field of Search ............... 210/702, 716, 717, 723, 210/724, 726, 721, 912, 913, 914; 252/175, 181, 631; 423/11, 34, 101

[56] References Cited

U.S. PATENT DOCUMENTS

| | | | |
|---|---|---|---|
| 2,766,204 | 10/1956 | Lowe | 423/11 |
| 2,873,169 | 2/1959 | Seaborg et al. | 210/723 |
| 3,013,978 | 12/1961 | Rosinski | 210/724 |
| 3,330,771 | 7/1967 | Komatsu et al. | 210/723 |
| 3,890,244 | 6/1975 | Carlin et al. | 252/631 |
| 3,997,439 | 12/1976 | Ayukawa | 210/721 |
| 4,269,706 | 5/1981 | Sondermann | 210/724 |
| 4,312,758 | 1/1982 | Berton et al. | 210/724 |
| 4,377,508 | 3/1983 | Rothberg | 423/11 |
| 4,405,573 | 9/1983 | Deininger et al. | 423/150 |
| 4,572,797 | 2/1986 | Silver | 252/631 |
| 4,983,306 | 1/1991 | Deininger et al. | 210/724 |

OTHER PUBLICATIONS

*The Condensed Chemical Dictionary* 8th Ed. Von Nostrand Reinhold Co. 1971.
Murman et al. "Experiments Utilizing $FeO_4^{-2}$ for Purifying Water," vol. 8, pp. 554–547, 1974 *Water Research*.
Cooper, "Chemistry in Water Reuse" vol. 2, pp. 5-1-1–561 Ann Arbor Science.
Murmann, "The Preparation and Oxidative Properties of Ferrate Ion", NTIS Publication PB-238057, 1974.
Waite, "Feasibility of Wastewater Treatment with Ferrate," ASCE Journal of Environmental Engineering Division, 105, pp. 1023–1034, 1979.

*Primary Examiner*—Peter A. Hruskoci
*Attorney, Agent, or Firm*—Bruce H. Cottrell; William A. Eklund

[57] ABSTRACT

A process of treating water to remove metal ion contaminants contained therein, said metal ion contaminants selected from the group consisting of metals in Groups 8, 1b, 2b, 4a, 5a, or 6a of the periodic table, lanthanide metals, and actinide metals including transuranic element metals, by adjusting the pH of a metal ion contaminant-containing water source to within the range of about 6.5 to about 14.0, admixing the water source with a mixture of an alkali or alkaline earth ferrate and a water soluble salt, e.g., a zirconium salt, in an amount sufficient to form a precipitate within the water source, the amount the mixture of ferrate and water soluble salt effective to reduce the metal ion contaminant concentration in the water source, permitting the precipitate in the admixture to separate and thereby yield a supernatant liquid having a reduced metal ion contaminant concentration, and separating the supernatant liquid having the reduced metal ion contaminant concentration from the admixture is provided. A composition of matter including an alkali or alkaline earth ferrate and a water soluble salt, e.g., a zirconium salt, is also provided.

8 Claims, 2 Drawing Sheets

METHOD OF TREATING WASTE WATER

TECHNICAL FIELD

The present invention relates to the field of water purification and more particularly to the field of treating aqueous waste streams containing various metal ion contaminants including, e.g., transition metal elements such as those of Groups 8, 1b or 2b of the periodic table, metal elements such as those of Groups 4a, 5a, or 6a of the periodic table, lanthanide metal elements, and actinide metal elements, e.g., transuranic elements such as plutonium. This invention is the result of a contract with the Department of Energy (Contract No. W-7405-ENG-36).

BACKGROUND ART

In the past few years, there has been increased interest by the water treatment industry in the use of ferrate salts as, e.g., a possible substitute for chlorination processes. For example, potassium ferrate may be used in the treatment and purification of water (see Murmann et al, "Experiments Utilizing $FeO_4-2$ for Purifying Water", Water Research, Vol. 8, pp. 79-93 (1974); Gilbert et al., "An Investigation of the Applicability of Ferrate Ion for Disinfection", J. Am. Water Works, Vol. 68(9), pp. 495-497 (1986); and Waite et al., "Iron (VI) Ferrate as a General Oxidant for Water and Wastewater Treatment", Ozone/Chlorine Dioxide Oxid. Prod., Org. Matter Process Conference, (1976), published 1978, pp. 410-425). Ferrate salts are also known as useful for precipitation and/or coagulation of solids in the wastewater.

DISCLOSURE OF INVENTION

It is one object of this invention to develop a process of treating metal contaminant-containing water to reduce the level of metal contaminants, such metal contaminants including, e.g., concentrations of transition metal elements such as those of Groups 8, 1b or 2b of the periodic table, metal elements such as those of Groups 4a, 5a, or 6a of the periodic table, lanthanide metal elements, and actinide metal elements, e.g., transuranic elements.

It is another object of this invention to remove such metal contaminants from contaminated water to under any governmental discharge limits, e.g., DOE and EPA effluent standards.

It is still a further object of this invention to minimize production of the resultant solid waste, i.e., sludge, upon removal of such metal contaminants from contaminated water.

Yet another object of this invention is to remove such metal contaminants from contaminated water without increasing the levels of chemical additives presently used and without significant alteration of presently existing process equipment.

To achieve the foregoing and other objects, and in accordance with the purposes of the present invention, as embodied and broadly described herein, the present invention provides a process of treating water to remove metal ion contaminants contained therein comprising adjusting the pH of a metal ion contaminant-containing water source to within the range of about 6.5 to about 14.0, such metal ions selected from the group consisting of transition metal elements from Groups 8, 1b or 2b of the periodic table, metal elements from Groups 4a, 5a, or 6a of the periodic table, lanthanide metal elements, and actinide metal elements, admixing said water source with a mixture of an alkali or alkaline earth ferrate and a water soluble salt containing a high valence metal ion selected from the group consisting of Groups IVB, VB, or VIB of the periodic table in an amount sufficient to form a precipitate within said water source, said amount of ferrate and water soluble salt containing a high valence metal ion effective to substantially reduce the metal ion contaminant concentration in said water source, permitting the precipitate in said admixture to separate and thereby yield a supernatant liquid having a reduced metal ion contaminant concentration, and separating said supernatant liquid having the reduced metal ion contaminant concentration from the admixture.

In one embodiment of the invention, the present invention provides a process of treating water to remove transuranic elements contained therein comprising adjusting the pH of a transuranic element-containing water source to within the range of about 6.5 to about 14.0, admixing said water source with an amount of an alkali or alkaline earth ferrate sufficient to form a precipitate within said water source, said amount of ferrate effective to substantially reduce the transuranic element concentration in said water source, permitting the precipitate in said admixture to separate and thereby yield a supernatant liquid having a reduced transuranic element concentration, and separating said supernatant liquid having the reduced transuranic element concentration from the admixture.

The present invention further provides a composition of matter useful in reducing the metal ion contaminant concentration of a metal ion contaminant-containing wastewater, such metal ions selected from the group consisting of transition metal elements from Groups 8, 1b or 2b of the periodic table, metal elements from Groups 4a, 5a, or 6a of the periodic table, lanthanide metal elements, and actinide metal elements, said composition including an alkali or alkaline earth ferrate, and a water soluble salt containing a high valence metal ion selected from the group consisting of Groups IVB, VB, and VIB of the periodic table.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

MODES FOR CARRYING OUT THE INVENTION

Figure 1:
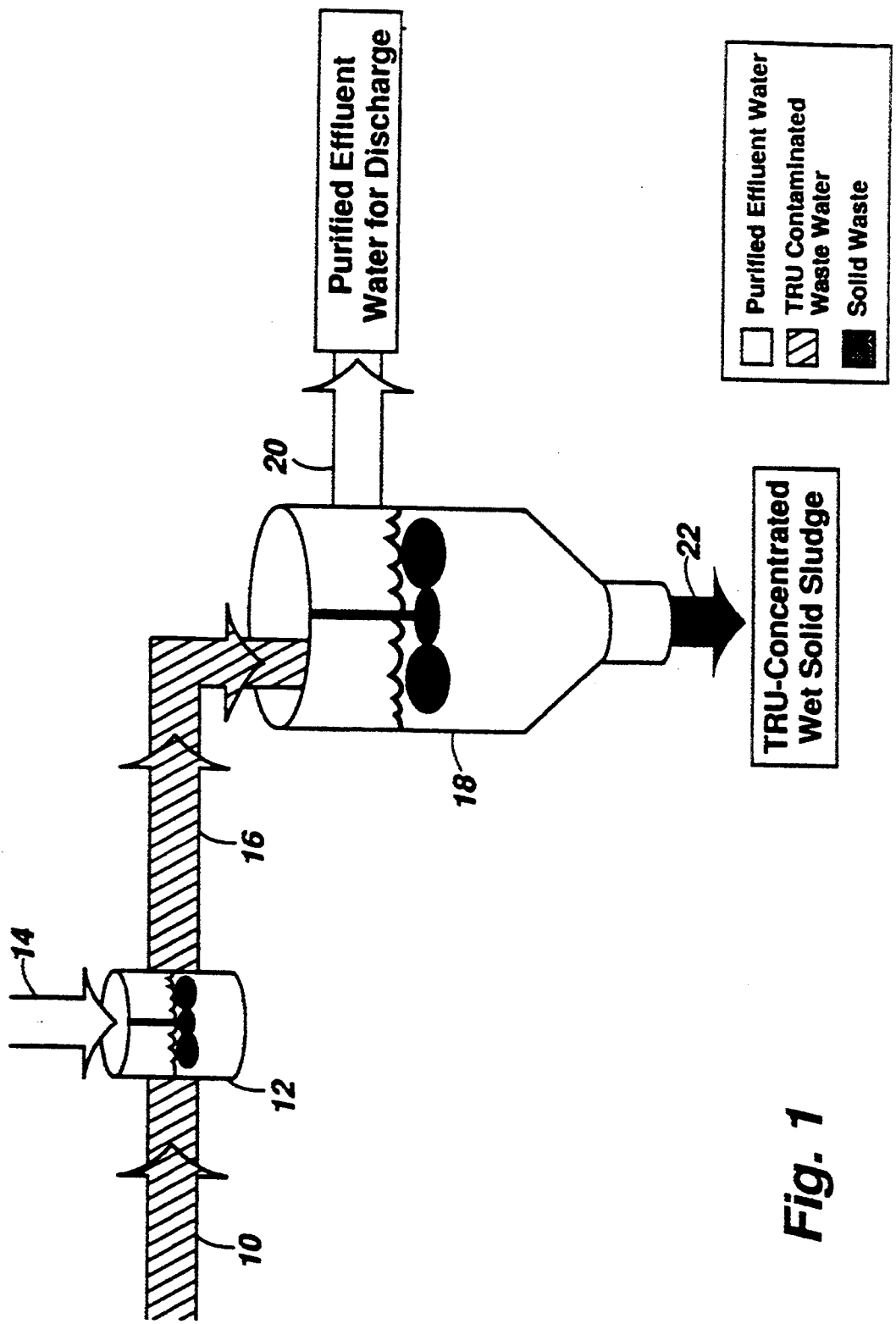
FIG. 1 is a representative schematic drawing of a wastewater treatment system for practicing the present invention.

While water treatment techniques are available to remove contaminants, e.g., metal contaminants including such examples as transition metal contaminants, heavy metal contaminants and certain transuranic metal contaminants, it is desirable that such processes generate a minimum of resultant sludge or solid waste as increased cost for disposal of solid metal wastes has forced industries and governmental agencies to seek techniques that generate less solid waste in a cost effective manner. Presently, ferric or ferrous salts such as ferric sulfate, ferric chloride and ferrous chloride or ferrous sulfate are used as coagulants for removal of trace amounts of many metallic elements from wastewater streams. However, lower allowable standards for wastewater discharge may not be easily met by such coagulants without generation of excessive solid waste.

Stricter laws and regulations aimed at protecting public health and preventing contamination of the environment have been gradually instituted by various federal and state governmental bodies. For example, the Water Pollution Control Act and Safe Drinking Water Act, which are administered by Environmental Protection Agency (EPA) have set specific requirements on the quality of water discharged into streams and served to the public as potable water. Other government agencies, such as the Department of Energy (DOE), have also promulgated orders setting permissible effluent discharge standards for transuranic elements and other radionuclides from DOE facilities. Previously, DOE Order 5480.1 derived concentration guideline sets discharge limits for plutonium 238, Plutonium 239/240 and americium 241 at $1 \times 10^{-4}$ microcuries per milliliter. A stricter standard now in force, DOE Order 5400.5, sets limits for the plutonium and americium contaminants at $3-4 \times 10^{-8}$ microcuries per milliliter. This standard may not be consistently achievable with the present processes of treating wastewater at DOE facilities.

The present invention concerns a wastewater treatment process which uses a mixture of ferrate ions and a water soluble salt containing a high valence metal ion selected from the group consisting of Groups IVB, VB, and VIB of the periodic table for the removal of trace amounts of metal ion contaminants, e.g., transition metal elements such as those of Groups 8, 1b or 2b of the periodic table, metal elements such as those of Groups 4a, 5a, or 6a of the periodic table, lanthanide metal elements, and actinide metal elements, e.g., transuranic (TRU) elements and other water-borne radionuclides via a coagulation/precipitation process. Metal contaminants removable by this process include group 8 metals such as iron, cobalt, nickel, ruthenium, rhodium, palladium, osmium, iridium, and platinum, group 1b metals such as copper, silver, and gold, group 2b metals such as zinc, cadmium, and mercury, group 4a metals such as lead, tin, and germanium, group 5a metals such as arsenic, antimony, and bismuth, and group 6a metals such as selenium, tellurium, and polonium.

In one embodiment, namely, in the treatment of waste water containing TRU elements and/or other radionuclide elements, the process can use only ferrate ions for the removal of the TRU elements via the coagulation/precipitation process. The resultant waste water effluent from this process with only ferrate can be substantially pure with respect to TRU elements and other radionuclide elements to within EPA drinking water and present Department of Energy (DOE) effluent standards, i.e., from 3 to $4 \times 10^{-8}$ microcuries per milliliter of plutonium 238/239/240 or americium 241. Other transuranic elements such as neptunium and curium, and uranium may also be removed by this process.

The wastewater treatment process of the present invention can achieve removal of metal ions including TRU elements to lower levels than can the existing ferric-based technology without the need for either drastic increases in chemical dosages or capital costs for new process equipment. The wastewater treatment process of the present invention is expected to further achieve the removal of metal ions including TRU elements with the use of very low dosages of additives thereby resulting in decreased production of iron-oxyhydroxide sludge in comparison to the existing technologies. Optionally, the wastewater treatment process of this invention can be used after a conventional ferric salt process has been employed to further reduce the metal ion concentration in the wastewater.

The process of the invention can be conducted in accordance with a water treatment system illustrated in FIG. 1. In FIG. 1, a continuous wastewater treatment process is shown including a metal ion contaminant-containing wastewater stream 10 which enters a flash mixer 12 wherein treatment chemicals 14 are added. A treated wastewater stream 16 enters clarifier 18 whereat a purified effluent stream 20 is removed for discharge and a metal ion contaminant-concentrated solid sludge 22 is removed for appropriate disposal.

In the present wastewater treatment process, it has been found that the control of the pH range is necessary to obtaining the highest level of metal ion contaminant removal. The pH range should preferably be from about 6.5 to about 14.0, more preferably from about 7.0 to about 13.0 most preferably from about 10 to about 12. Above about 14.0, the removal of the metal ion contaminants is generally poor as the ferrate becomes less stable, while below 6.5 the various ferrate salts are also less stable resulting in a substantially decreased performance.

In the preferred embodiment of the present wastewater treatment process, a high valence metal ion selected from the group consisting of Groups IVB, VB, or VIB of the periodic table is added as an enhancing agent in admixture with the ferrate. Such high valence metal ions include $Ti^{+4}$, $Zr^{+4}$, $Hf^{+4}$, $V^{+4}$, $V^{+5}$, $Nb^{+3}$, $Nb^{+4}$, $Nb^{+5}$, $Ta^{+3}$, $Ta^{+4}$, $Ta^{+5}$, $Mo^{+3}$, $Mo^{+4}$, $Mo^{+5}$, $Mo^{+6}$, $W^{+3}$, $W^{+4}$, $W^{+5}$, and $W^{+6}$, preferably $Zr^{+4}$. One manner of adding such high valence metal ions is as oxymetallic ions such as zirconyl ions ($ZrO^{2+}$), titanyl ions ($TiO^{2+}$), hafnyl ions ($HfO^{2+}$), vanadyl ions ($VO^{2+}$), molybdate ions ($MoO^{2+}$) and the like. Such oxymetallic ions may be added as water soluble salts of such ions. Zirconyl ions are preferred as the additive or enhancing agent used in combination with the ferrate in practicing the present invention. Such zirconyl ions can be added as a water soluble zirconium compound, e.g., zirconium oxychloride ($ZrOCl_2.8H_2O$), zirconium oxybromide or zirconium oxyiodide. While not wishing to be bound by the present explanation, such oxymetallic ions, e.g., zirconyl ions, are believed to provide for decomplexation and adsoption of metal ion contaminants from various organic complexes in which the metal ion contaminants can become associated. While such water soluble salts are described as added in combination with the ferrate in practicing the invention, such salts may also be added prior to addition of the ferrate or after addition of the ferrate so long as there is sufficient ferrate still present to permit reduction of the metal ion contaminant concentration.

Preferably, the water soluble salts of a high valence metal ion, e.g., a zirconium salt, are added in an amount effective to further reduce the metal ion contaminant concentrations in the resultant purified water. Generally, water soluble zirconium salt added in amounts sufficient to give zirconium ion concentrations of from about $1 \times 10^{-8}$ molar to about 10 grams per liter, preferably from about 0.01 to about 1 gram per liter, more preferably from about 0.05 to about 0.5 grams per liter will achieve the desired effective amount.

The ferrate ions in the mixture admixed with the pH-adjusted wastewater can be provided by any suitable alkali or alkaline earth ferrate in the form of either a solid or a liquid solution. Suitable ferrate compounds include potassium ferrate, sodium ferrate, or barium ferrate. Potassium ferrate is preferred as the ferrate source.

The ferrate is generally added to the wastewater in amounts sufficient to give iron concentrations, based upon ferrate ion, of from about 0.1 parts per million (ppm) to about 250 ppm, more preferably from about 1 ppm to about 50 ppm, and most preferably from about 2 to about 25 ppm. Generally, amounts of ferrate yielding iron concentrations above about 250 ppm are undesirable as such levels may generate excessive floc or solid waste.

In the practice of the present process, either the ferrate or the mixture of ferrate and the water soluble salt, e.g., a zirconium salt, can be used to remove the trace amounts of the metal ion contaminants in either a batch or a continuous process. Also, the temperature of the wastewater during operation of the present process can be varied so long as the wastewater stream remains liquid. Generally, the wastewater temperature can be from about $-25°$ Celsius ($°C$.) to about $95°$ C., more preferably from about $0°$ C. to about $70°$ C.

The present invention is more particularly described in the following examples which are intended as illustrative only, since numerous modifications and variations will be apparent to those skilled in the art.

Example 1 describes comparative studies made between the previous techniques using ferric sulfate ($Fe_2(SO_4)_3$) or potassium permanganate ($KMnO_4$), and the technique of the present invention, i.e., using potassium ferrate ($K_2FeO_4$).

EXAMPLE 1

An aqueous waste stream sample was collected from the Los Alamos TA-50 waste treatment plant. The sample was of final effluent, already treated with one or more passes through a ferric salt addition, coagulation, settling and filtration process. The final effluent was that designated for discharge to the environment. Smaller samples of 600 milliliter (ml) volume were measured out from the waste stream and the pH measured. To each 600 ml sample was added 0.36 grams (g) of calcium chloride with stirring. The pH was again measured and adjusted to 8.0 if needed. Each 600 ml sample was then divided into three 200 ml samples and each 200 ml sample was placed into a separate reaction vessel. Teflon-coated stir bars were placed into each vessel and the vessels were placed on stirring plates to provide for agitation. Glass rods were placed in each vessel to act as baffles.

A specific amount of either ferric sulfate, potassium permanganate or potassium ferrate was then added to each respective reaction vessel. These amounts were added to correspond to the desired parts per million of iron or manganese. Observations such as color change, time of addition, and pH were made. The solutions were then stirred rapidly for 15 minutes and observations were again made. Stirring was then stopped and the solutions were allowed to settle overnight for about 15 to 18 hours. A sample of each clarified supernatant solution was analyzed for transuranic elements as total counts of alpha radioactivity using a standard plate alpha-counting apparatus. The results of these comparative studies are shown in Table 1.

TABLE 1

| sample | ppm Fe or Mn | initial pH | final pH of decant | alpha count of decant in microcuries per milliliter |
| --- | --- | --- | --- | --- |
| final effluent | — | 7.8 | 7.7 | $2.4 \times 10^{-7}$ |
| ferric | | | | |
| #1 | 2 | 8.0 | 7.1 | $6.0 \times 10^{-8}$ |
| #2 | 5 | 7.4 | 7.4 | $3.0 \times 10^{-8}$ |
| #3 | 13 | 7.4 | 7.4 | $8.4 \times 10^{-8}$ |
| #4 | 26 | 7.6 | 7.3 | $6.7 \times 10^{-8}$ |
| #5 | 79 | 7.8 | 7.1 | $6.7 \times 10^{-8}$ |
| #6 | 186 | — | 6.8 | $6.7 \times 10^{-8}$ |
| permanganate | | | | |
| #1 | 2 | 7.8 | 7.8 | $6.3 \times 10^{-9}$ |
| #2 | 5 | — | 7.7 | $5.1 \times 10^{-8}$ |
| #3 | 10 | 7.4 | 7.6 | $4.8 \times 10^{-8}$ |
| #4 | 25 | 7.4 | 7.5 | $2.1 \times 10^{-8}$ |
| #5 | 50 | 7.5 | 7.6 | $3.0 \times 10^{-8}$ |
| #6 | 150 | 7.5 | 7.8 | $5.8 \times 10^{-8}$ |
| #7 | 350 | — | 9.1 | $4.9 \times 10^{-8}$ |
| ferrate | | | | |
| #1 | 2 | 7.6 | 7.5 | $4.2 \times 10^{-8}$ |
| #2 | 5 | 7.7 | 7.5 | $9.0 \times 10^{-9}$ |
| #3 | 10 | 7.8 | 7.5 | $2.7 \times 10^{-9}$ |
| #4 | 30 | 7.9 | 7.6 | $3.6 \times 10^{-9}$ |
| #5 | 70 | 8.0 | 8.0 | $3.6 \times 10^{-9}$ |

Figure 2:
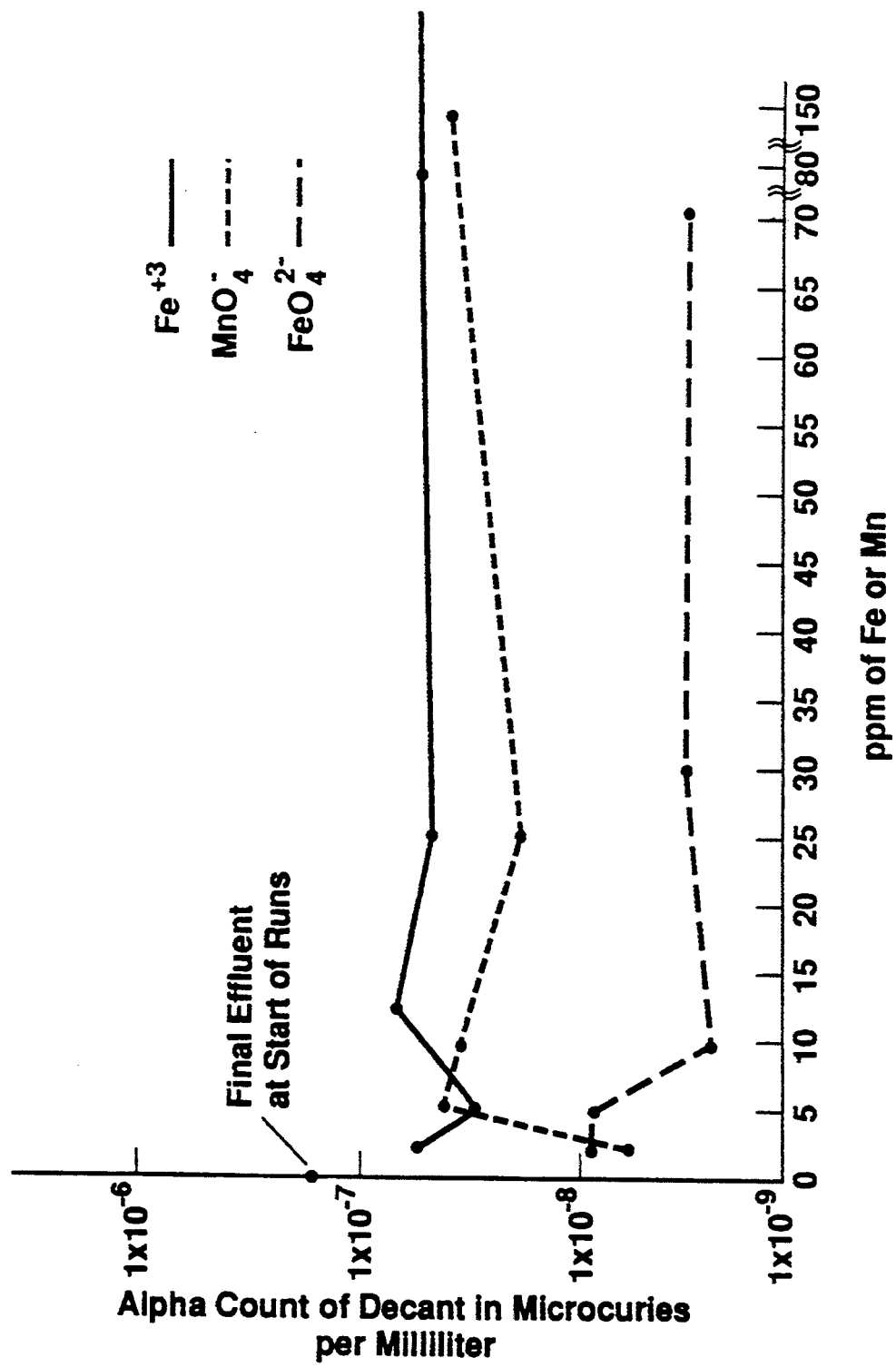
FIG. 2 is a graph of experimental results showing a comparison of the use of ferrate in accordance with the present invention with the use of ferric ions or permanganate ions, and the efficiency of each in removing transuranic elements from wastewater.

The results of Table 1 show that the use of ferrate removes transuranic elements from wastewater final effluents to lower levels than is possible by the use of ferric ions (ferric sulfate) or permanganate ions (potassium permanganate). FIG. 2 graphically illustrates the final effluent treatment results given in Table 1.

Example 2 describes comparative testing of wastewater treatments using ferrate ions alone and in combination with zirconium ions.

EXAMPLE 2

Aqueous waste stream samples were collected from the Los Alamos TA-50 waste treatment plant. The various samples included: (a) a sample of raw plant feed which is the original feed that arrives at the wastewater treatment facility; (b) a sample of final effluent which is that designated for discharge to the environment; and, (c) a sample of clarifier overflow from the treatment plant clarifier. Samples of 1000 milliliter volumes of the water were each placed into a reaction vessel and the pH adjusted to predetermined values. In some tests, measured amounts of reagent grade hydrated zirconium oxychloride salt were added while agitating rapidly, followed by addition of measured amounts of potassium ferrate salt to the stirred vessel. The admixture was allowed to mix from about 2 to about 5 minutes. This was to simulate a flash mixing step of a typical water treatment plant. In some tests, only the potassium ferrate was added during the flash mixing step. The vessel contents were then stirred much more slowly to simulate a stirred coagulation step for about 30 minutes whereafter stirring was stopped. After at least another 30 minutes and up to about 4 hours depending upon the sample and additives, the samples were allowed to sit without disturbance to simulate a plant gravity settling step for clarification of the slurry to a concentrated sludge and a clarified supernatant liquid. Samples of each clarified supernatant liquid were analyzed as total counts of alpha radioactivity using a standard plate alpha-counting apparatus, and some supernatant samples were concentrated in terms of plutonium using an ion-exchange technique and counted by gamma spectrometry. The latter analysis gives a more accurate measure at the low analytical levels. The results are shown in Table 2.

TABLE 2

| sample | ppm Fe as $FeO_4^{-2}$ | g/l as $ZrOCl_2 \cdot 8H_2O$ | alpha count of decant in picocuries/liter | plutonium (picocuries/l) Pu 239 | Pu 23 |
| --- | --- | --- | --- | --- | --- |
| aqueous raw feed | 0.0 | 0.0 | 61,400 ± 1500 | — | — |
| raw feed treated | | | | | |
| #1 pH 6.5 | 10 | 0.5 | 1300 ± 200 | — | — |
| #2 pH 6.5 | 10 | 0.5 | 1900 ± 300 | — | — |
| #3 pH 6.5 | 10 | 0.0 | 6800 ± 500 | — | — |
| final effluent | 0.0 | 0.0 | 440 ± 130 | — | — |
| final effluent treated | | | | | |
| #1 pH 9.4 | 5 | 0.5 | 74 ± 66 | — | — |
| #2 pH 9.4 | 10 | 0.5 | 240 ± 100 | — | — |
| #3 pH 9.4 | 25 | 0.5 | 56 ± 60 | 24 ± 7 | 6 ± 5 |
| #4 pH 9.4 | 5 | 0.0 | 130 ± 82 | — | — |
| #5 pH 9.4 | 10 | 0.0 | 190 ± 93 | — | — |
| #6 pH 9.4 | 25 | 0.0 | 120 ± 77 | — | — |
| #7 pH 6.5 | 25 | 0.5 | 47 ± 58 | 3.6 ± 4.2 | 4.7 ± 4.2 |
| #8 pH 6.5 | 25 | 0.0 | 28 ± 52 | 8.4 ± 4.6 | 2.0 ± 3.6 |
| clarifier overflow | 0.0 | 0.0 | 160 ± 87 | 78 ± 54 | 62 ± 49 |
| clarifier overflow treated | | | | | |
| #1 pH 12 | 5 | 0.03 | 47 ± 58 | 3.0 ± 7.0 | 0 ± 6.0 |
| #2 pH 12 | 25 | 0.03 | 0 ± 41 | 8.5 ± 4.6 | 3.3 ± 3.8 |

The results of Table 2 show that the use of ferrate ions and zirconium ions in combination are superior in removing transuranic elements than ferrate ions alone. For example, comparison of (a) raw feed treated samples 1 and 2 with 3, (b) final effluent treated samples 1, 2 and 3 with 4, 5 and 6, and (c) final effluent treated sample 7 with 8, show the improvement obtained by ferrate ions in combination with zirconium ions. Namely, that the combination of ferrate ions and zirconium ions as in final effluent treated samples 1, and 3 achieved levels beneath 100 picocuries per liter, a general detection limit level for gross alpha counts, while the final effluent treated samples 4, 5 and 6 without the use of the zirconium ions had alpha counts above the general detection level limit. Also, in comparing samples 7 and 8 of the final effluent treated samples, sample 7 had a lower number than sample 8 for Pu 239 which is generally considered to be a more accurate number than those for Pu 238.

In addition, the results show that substantially all of the transuranic elements can be removed using treatment levels of this admixture of only a few parts per million. In comparison, the standard commercialized process generally employs 100 parts per million of an ferric or ferrous salt and 300 parts per million of lime (calcium hydroxide) to obtain the same or slightly less transuranic element removal. Thus, it appears reasonable to expect that the process of this invention using a preferred amount of additive of about 1 to about 25 parts per million would result in considerably less insoluble sludge than the prior processes that generally require from about 100 to about 400 parts per million of additives.

Example 3 describes comparative testing of wastewater including various metal ion contaminants using ferrate ions in combination with zirconium ions.

EXAMPLE 3

Simulated metal ion contaminant-containing waste water was prepared by dissolving appropriate amounts of atomic-absorption standard solutions into deionized water so that a simulated wastewater stock solution contained 50 parts per million (ppm) each of the metal ions of zinc ($Zn^{+2}$), copper ($Cu^{+2}$), nickel ($Ni^{+2}$), cadmium ($Cd^{+2}$), lead ($Pb^{+2}$), and silver ($Ag^{+1}$). Individual samples of the stock solution were placed into glass reaction vessels and the pH was adjusted to from between 11 and 12 by addition of concentrated sodium hydroxide.

Two reagents were used in the tests: reagent grade zirconium oxychloride and a potassium ferrate blend comprised of 25.5 weight percent potassium ferrate and 74.5 weight percent potassium chloride. The amount of zirconium oxychloride was adjusted to yield a solution of 0.5 grams per liter of zirconium oxychloride, equivalent to 0.14 grams per liter of $Zr^{+4}$. The amount of potassium ferrate was adjusted to yield a solution of 5 milligrams per liter of Fe as $FeO_4^{-2}$. For each sample run, the procedure was to rapidly mix the initial water sample using a six-paddle stirrer for waste water testing, followed by addition of the pre-selected chemicals, i.e., zirconium oxychloride and potassium ferrate. This simulated flash-mixing stirring was continued for from about 3 to about 5 minutes after addition of the chemicals. Then, the speed of the stirrer was slowed such that any suspended solids in the water were just barely maintained in suspension thereby simulating coagulative mixing similar to that which would occur in a full-scale gravity clarifier. Slow mixing was continued for from about 1 to about 4 hours, or until the ferrate ion had degraded (noted by visual observation as the solution clears from the presence of purple ferrate ion). Stirring was then stopped, the stirrer removed from the solution, and the solution allowed to settle for about 2 hours. Clarified decantant was poured off the top of the settled slurry, filtered on a 0.45 micron pore size glass filter, and acidified with high purity electronic-grade HCl. The resultant water sample was then analyzed for the concentration of the metal contaminants using direct-aspiration atomic absorption spectrometry (AAS). Sample run 1 included the addition of sodium hydroxide alone. Sample run 2 included the addition of sodium hydroxide and zirconium oxychloride. In sample run 3, the simulated wastewater in the reaction vessel was mixed with the sodium hydroxide and potassium ferrate. In sample run 4, the simulated wastewater was mixed with the sodium hydroxide, potassium ferrate and zirconium oxychloride.

The separated water of selected decantants was subsequently treated again. Sample runs 5 and 6 involved the secondary treatment of the decantant from sample 1 following an initial treatment with sodium hydroxide alone. In sample run 5, the decantant was treated with potassium ferrate while in sample run 6 the decantant was treated with a mixture of potassium ferrate and zirconium oxychloride. After a repeat of the mixing, settling and decanting steps, these samples were again analyzed for metals concentration by AAS. The results are shown in Table 3.

TABLE 3

| | | ppm of Metals in solution as determined by AAS | | | | | |
|---|---|---|---|---|---|---|---|
| pH | | Zn | Cu | Ni | Cd | Pb | Ag |
| Initial Feed for #1–#4 | | 50 | 50 | 50 | 50 | 50 | 50 |
| sample #1 (NAOH) | 11.3 | 0.7 | 0.2 | 0.2 | 0.3 | 2.1 | 0.5 |
| sample #2 (NAOH + Zr) | 11.7 | 0.5 | 0.1 | 0.1 | 0.08 | 0.36 | 0.02 |
| sample #3 (NaOH + ferrate) | 11.8 | 1.6 | 0.07 | <0.01 | 0.03 | <0.01 | 0.03 |
| sample #4 (NaOH + Zr + ferrate) | 11.8 | 0.26 | 0.03 | <0.01 | 0.03 | <0.01 | <0.01 |
| initial feed for #5 + #6 | | 0.7 | 0.2 | 0.2 | 0.3 | 2.1 | 0.5 |
| sample #5 (ferrate) | 11.6 | 0.02 | <0.01 | <0.01 | <0.01 | <0.01 | 0.01 |
| sample #6 (Zr + ferrate) | 11.5 | <0.01 | <0.01 | <0.01 | <0.01 | <0.01 | 0.02 |

The results of Table 3 show that the addition of zirconium oxychloride will remove the metals of groups 1b, 2b, 4a and 8 from water to lower levels at pH of about 11 to 12 than by addition of sodium hydroxide alone as seen in sample runs 1 versus 2. The results of Table 3 further show that in general the admixture of ferrate ion, i.e., potassium ferrate and zirconium oxychloride removes the metals of groups 1b, 2b, 4a, and 8 from water to lower levels than with sodium hydroxide, zirconium oxychloride or potassium ferrate as individual treatments as seen from comparing sample run 4 with sample runs 1–3 and sample run 6 with sample runs 1, 2 and 5.

Although the present invention has been described with reference to specific details, it is not intended that such details should be regarded as limitations upon the scope of the invention, except as and to the extent that they are included in the accompanying claims.

We claim:

1. A process of treating water to reduce the concentration of metal ion contaminants contained therein, said metal ion contaminants selected from the group consisting of zinc, copper and silver, comprising:
   a. adjusting the pH of said water to within the range of about 11 to about 12;
   b. admixing said water with a mixture of an alkali or alkaline earth ferrate and zirconium oxychloride, in an amount sufficient to form a precipitate within said water, said amount of the mixture effective to reduce the metal ion contaminant concentration in said water, wherein said ferrate is added to the water in amounts sufficient to give iron concentrations, based upon ferrate ion, of from about 0.1 parts per million to about 250 parts per million and said zirconium oxychloride is added to the mixture at from about 0.01 to about 1 gram of zirconium oxychloride per liter of water; and
   c. allowing the precipitate in the admixture to separate and thereby yield a supernatant liquid having a reduced concentration of said metal ion contaminants; and
   d. separating said supernatant liquid having the reduced concentration of said metal ion contaminants from the admixture.

2. The process of claim 1 wherein the alkali or alkaline earth ferrate is potassium ferrate.

3. The process of claim 2 wherein the potassium ferrate is added as a solid.

4. The process of claim 2 wherein the potassium ferrate is added as a solution.

5. A process of treating water to remove metal ion contaminants contained therein, said metal ion contaminants selected from the group consisting of zinc, copper and silver, comprising:
   a. adjusting the pH of said water to within the range of about 11 to about 12;
   b. admixing said water with a mixture of an alkali or alkaline earth ferrate and zirconium oxychloride, in an amount sufficient to form a precipitate and substantially remove the metal ion contaminants from the water, wherein said ferrate is added to the water in amounts sufficient to give iron concentrations, based upon ferrate ion, of from about 0.1 parts per million to about 250 parts per million and said zirconium oxychloride is added to the mixture at from about 0.01 to about 1 gram of zirconium oxychloride per liter of water;
   c. separating water having a substantially reduced metal ion contaminant concentration from said precipitate.

6. The process of claim 5 wherein the alkali or alkaline earth ferrate is potassium ferrate.

7. The process of claim 6 wherein the potassium ferrate is added as a solid.

8. The process of claim 6 wherein the potassium ferrate is added as a solution.

* * * * *